3,119,436
FURNACE FOR INTERMITTENT COMBUSTION, PARTICULARLY FOR STEAM BOILERS AND HEATING BOILERS
John Anders Rydberg, Stockholm, Sweden, assignor to Aktiebolaget Gustavsbergs Fabriker, Gustavsberg, Sweden, a corporation of Sweden
Filed Sept. 20, 1961, Ser. No. 139,498
Claims priority, application Sweden Sept. 22, 1960
1 Claim. (Cl. 158—4)

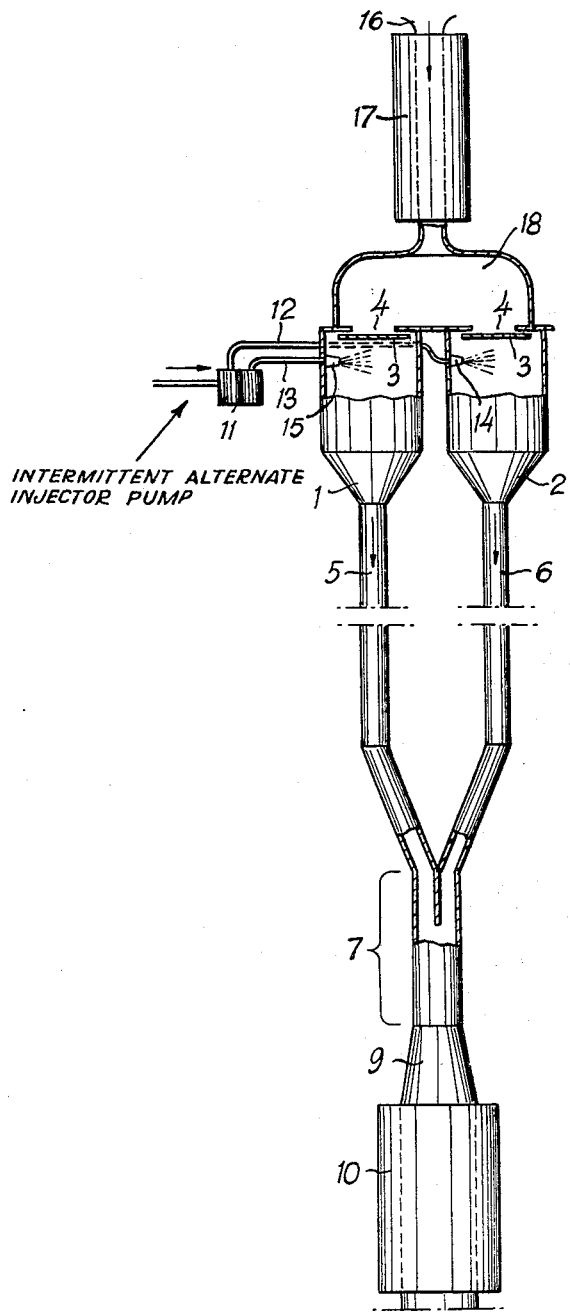

This invention relates to furnaces of the type operating with intermittent combustion. In such furnaces, the combustion is more or less explosive, resulting in high gas velocities in the outlet ducts which communicate with the furnaces and which are water-cooled if the furnaces are used in connection with steam boilers and heating boilers. Due to the high gas velocity a very efficient heat transfer is obtained. Among furnaces of this kind there are types which are operating at natural frequency, but this frequency is often so high that the plant is annoying for the surroundings in view of the high sound intensity. Plants have also been proposed in which the frequency of combustion is determined by intermittently operating and positively controlled fuel supply devices which render possible lowering of the frequency of combustion to arbitrarily low values so as to reduce or eliminate the disturbing noise (see U.S. Patent No. 3,091,224).

The invention relates to a furnace of the last-named type and is substantially characterized in that the furnace comprises at least two combustion chambers having air intakes which are controlled by non-return valves and communicate with a common air supply duct, positively controlled fuel supply means being provided for intermittent and alternate injection of fuel into the chambers which are in open communication with individual outlet ducts merging into each other for forming a symmetric jet pump such that gases discharged during combustion from one combustion chamber will set up a negative pressure in the outlet duct of a combustion chamber which is sucking in air. Considerable advantages are obtained by the combination of two or more combustion chambers in the manner indicated. Since air is always sucked into any of the combustion chambers, air will always pass through the air supply duct, and the air stream will be automatically directed from one combustion chamber to another one without being retarded to a considerable extent. As a result thereof, the kinetic energy of the air can be utilized for filling the combustion chambers, thus increasing the volume of air sucked in and the capacity of the furnace.

The invention is described more closely hereinbelow with reference to an embodiment illustrated in the accompanying drawing.

The furnace system illustrated in the drawing comprises two combustion chambers 1 and 2 which are provided with air intakes 4 controlled by non-return valves 3. The two combustion chambers are in open communication with individual outlet ducts 5 and 6, respectively, which merge into each other for forming a symmetric jet pump 7 discharging into a diffuser 9 which is connected to a silencer 10.

Fuel is supplied by a diagrammatically illustrated fuel pump 11 of the well known type used for diesel engines which by means of individual ducts 12 and 13 communicates with fuel injectors 14 and 15, respectively, provided in the combustion chambers. The driving fluid for the jet pump 7 is delivered thereto alternately through ducts 5 and 6 producing a negative pressure alternately in the ducts 6 and 5 respectively. The pump 11 is adapted to supply fuel at regular intervals intermittently and alternately to either of the two combustion chambers 1 and 2.

Air is supplied to the plant through an air supply duct 16 which communicates with the ambient air and is associated with a silencer 17. The air supply duct 16 opens into a distribution chamber 18 which in turn communicates with the air intakes 4 of the combustion chambers 1 and 2.

The furnace structure described may be used in connection with a heating boiler, in which case at least the outlet ducts 5 and 6 and preferably also the combustion chambers 1 and 2 are water-cooled.

When the furnace is to be started, it may be assumed that both combustion chambers are filled with air at atmospheric pressure. When the pump 11 is started, it may be assumed that at first fuel is supplied to the combustion chamber 1. The fuel which may be a fuel oil is atomized by the nozzle 15, and the fuel-air mixture is ignited by an electric ignition device not shown, the result being a rapid increase in pressure causing the inlet valve 3 to be closed and the products of combustion to be discharged at a high velocity through the outlet duct 5. When passing through the jet pump 7, the gases produce a negative pressure in the outlet duct 6 and, consequently, in the combustion chamber 2, resulting in that air will be sucked into said chamber. However, the gases passing at a high velocity through the outlet duct also produce a negative pressure in the combustion chamber 1 with the result that the non-return valve 3 of this chamber will be opened and air admitted into the chamber 1. Simultaneously, fuel is injected into the combustion chamber 2 and ignited by an electric ignition device not shown. When the gases discharged through the outlet duct 6 are flowing through the jet pump 7, a negative pressure is produced which accelerates the gases in the outlet duct 5 and thereby increases the suction action at the intake 4 of the combustion chamber 1. Since fuel is alternately supplied to either of the combustion chambers, the gases leaving one of the chambers will facilitate filling of the other chamber with air. Since filling of one chamber starts as soon as the fuel is ignited in the other chamber, air will substantially always flow through the air supply duct 16. This air stream is not subjected to retardation, but will be alternately directed in the distribution chamber 18 to either air intake 4, resulting in that the kinetic energy of the air will be utilized for filling the combustion chambers.

After the furnace system has reached its steady state the electric ignition devices may be usually cut out, since the fuel will be ignited by itself due to the high temperature in the combustion chambers.

From the above it will be understood that a furnace system comprising two or more combustion chambers in accordance with the invention will have an improved volumetric efficiency as compared with a single combustion chamber. Due to this fact a greater amount of fuel can be burnt and the capacity of the furnace system is increased. Since the air supply duct 16 can be dimensioned in accordance with the amount of air required for a single combustion chamber, it may be comparatively small which also holds true of the suction silencer 17. The outlet duct, too, has small dimensions, resulting in that the outlet silencer 10 need not be very bulky in spite of the fact that the gas velocity has been reduced in the diffusor 9.

The frequency of combustion is determined by the pump 11 which may be controlled such that the frequency will be considerably lower than the natural frequency of the combustion chambers and preferably lower than 25 cycles per second for each chamber. This low frequency results in itself in that the furnace system will be less disturbing as regards noise. In addition thereto each explosion will be milder as a result of the division of the fuel due to the provision of two or more combustion chambers. On the inlet side, the uniform air stream through the duct 16 contributes to a silent operation of the furnace system.

The effect of the jet pump 7 may be utilized even in furnaces having no common air supply duct and suction silencer. Although the invention has been described in connection with a furnace fired by a liquid fuel, it may be applied as well to furnaces fired by a gaseous or pulverized fuel.

What I claim is:

A furnace for intermittent combustion, comprising at least two combustion chambers each having an air intake, non-return valves controlling said air intakes, a common air supply duct in open communication with the surrounding atmosphere and communicating with the combustion chambers through said air intakes, positively controlled fuel supply means for intermittent and alternate injection of fuel into the combustion chambers, individual outlet ducts for the combustion chambers in open communication therewith, said outlet ducts merging into each other to form a symmetric jet pump, and a silencer communicating with the outlet of said pump.

References Cited in the file of this patent

UNITED STATES PATENTS

| | | |
|---|---|---|
| 1,909,511 | Wilson | May 16, 1933 |
| 1,954,516 | Bourne | Apr. 10, 1934 |
| 2,599,103 | Goddard | June 3, 1952 |
| 2,627,163 | Anderson et al. | Feb. 3, 1953 |
| 2,655,205 | Linderoth | Oct. 13, 1953 |
| 2,708,926 | Huber et al. | May 24, 1955 |
| 2,748,753 | Sarrazin et al. | June 5, 1956 |
| 2,763,983 | Kafka | Sept. 25, 1956 |
| 2,838,102 | Reimers | June 10, 1958 |
| 2,872,780 | Schmidt | Feb. 10, 1959 |